(12) United States Patent
Shaylor

(10) Patent No.: US 6,996,745 B1
(45) Date of Patent: Feb. 7, 2006

(54) PROCESS FOR SHUTTING DOWN A CPU IN A SMP CONFIGURATION

(75) Inventor: Nicholas Shaylor, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 617 days.

(21) Appl. No.: 09/967,595

(22) Filed: Sep. 27, 2001

(51) Int. Cl.
G06F 11/00 (2006.01)

(52) U.S. Cl. .......................... 714/24; 714/23
(58) Field of Classification Search .............. 714/24, 714/27, 11, 48, 23
See application file for complete search history.

(56) References Cited

U.S. PATENT DOCUMENTS

| | | | |
|---|---|---|---|
| 4,394,727 A | 7/1983 | Hoffman et al. ............. 364/200 |
| 5,423,045 A * | 6/1995 | Kannan et al. ............. 713/322 |
| 5,583,987 A | 12/1996 | Kobayashi et al. .... 395/182.11 |
| 5,742,753 A * | 4/1998 | Nordsieck et al. ............. 714/11 |
| 5,815,651 A | 9/1998 | Litt ........................ 395/182.08 |
| 5,838,976 A | 11/1998 | Summers .................... 395/704 |
| 5,860,002 A | 1/1999 | Huang ........................ 395/652 |
| 5,860,101 A | 1/1999 | Arimilli et al. ............. 711/121 |
| 5,983,326 A | 11/1999 | Hagersten et al. .......... 711/147 |
| 6,035,426 A * | 3/2000 | Applegate .................... 714/54 |
| 6,105,053 A * | 8/2000 | Kimmel et al. ............. 718/105 |
| 6,378,027 B1 * | 4/2002 | Bealkowski et al. ........ 710/302 |
| 6,516,429 B1 * | 2/2003 | Bossen et al. ................ 714/47 |
| 6,594,785 B1 * | 7/2003 | Gilbertson et al. ........... 714/48 |
| 2002/0124194 A1 * | 9/2002 | Dawkins et al. ............ 713/310 |
| 2002/0184576 A1 * | 12/2002 | Arndt et al. .................. 714/48 |
| 2002/0188877 A1 * | 12/2002 | Buch .......................... 713/320 |

* cited by examiner

Primary Examiner—Robert Beausoliel
Assistant Examiner—Marc Duncan
(74) Attorney, Agent, or Firm—Gunnison, McKay & Hodgson, L.L.P.; Forrest Gunnison

(57) ABSTRACT

A symmetric multiprocessor (SMP) system includes a plurality of central processing units (CPUs). Processing by a central processing unit (CPU) is safely halted i.e., a CPU is shut down, using a technique that assures that the CPU is executing an idle thread when the CPU is shut down. Halting the CPU safely means (a) that the CPU cannot be executing a thread other than the idle thread, and (b) that state information for a thread does not reside only within the CPU. The first limitation assures that the CPU cannot be executing a time critical thread that fails if the execution of the time critical thread has to move to another CPU.

20 Claims, 7 Drawing Sheets

Fig. 5
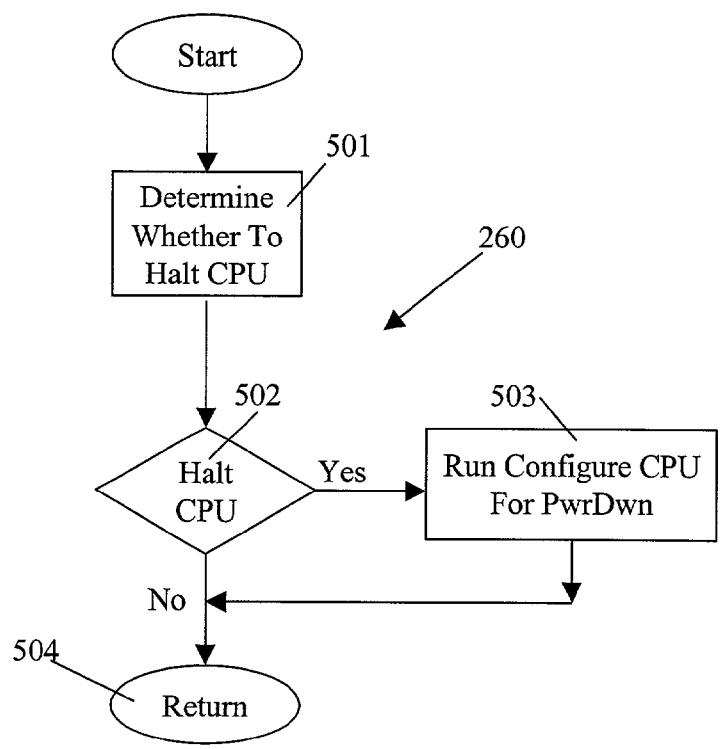
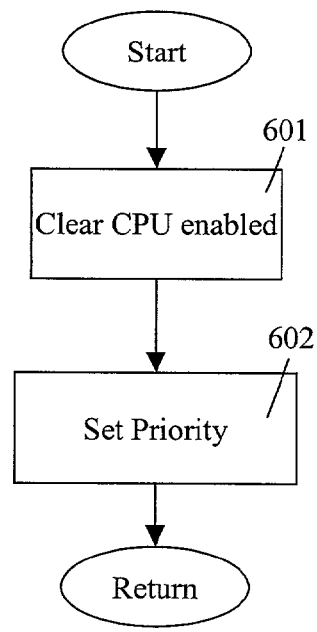
Fig. 6A
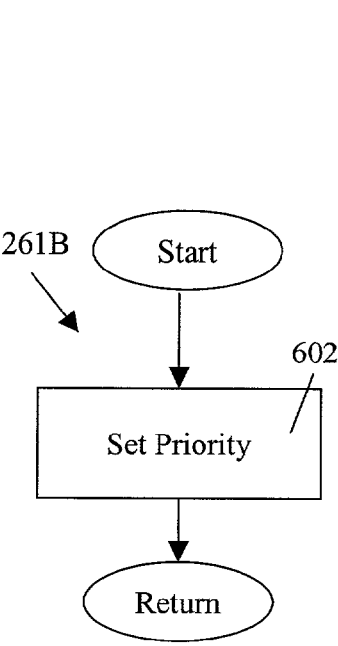
Fig. 6B

PROCESS FOR SHUTTING DOWN A CPU IN A SMP CONFIGURATION

BACKGROUND OF THE INVENTION

1. Field of the Invention

This invention relates generally to SMP architectures, and more particularly to stopping a CPU in a SMP architecture.

2. Description of Related Art

Symmetric multiprocessor (SMP) systems are known to those of skill in the art. In general, a multiprocessor system is characterized as symmetric if all processors in the system have the same memory subsystem. Thus, typically, a SMP system 100 includes a plurality of central processing units (CPUs) 101-1 to 101-n connected to a common memory controller 130 and system memory 135 via a common bus 110. Other elements connected to common bus 110 include L2 caches 102-1 to 102-n, a network interface 115, I/O components 116, and a system clock 117.

Various aspects of SMP systems have been considered in the prior art. Some of the SMP system prior art focuses on detecting a CPU failure in SMP system 100 and continuing operations with the failed CPU. See for example, U.S. Pat. No. 5,815,651, entitled "Method and Apparatus For CPU Failure Recovery in Symmetric Multi-Processing Systems," of Litt, or U.S. Pat. No. 5,583,987, entitled "Method and Apparatus For Initializing A Multiprocessor System while Resetting Defective CPU's Detected During Operation Thereof," of Kobayashi et al., both of which are incorporated herein by reference.

Other SMP literature concerns determining performance of SMP system 100. See for example, U.S. Pat. No. 5,838,976, entitled "System and Method for Profiling Code on Symmetric Multiprocessor Architectures," of Summers, which is incorporated herein by reference.

Other aspects in the SMP prior art include U.S. Pat. No. 5,860,002 entitled "System for Assigning Boot Strap Processor in Symmetric Multiprocessor Computer with Watchdog Reassignment," of Huang, and U.S. Pat. No. 5,860,101, entitled "Scalable Symmetric Multiprocessor Data-Processing System with Data Allocation Among Private Caches and Segments of System Memory," of Arimillli et al., both of which are incorporated herein by reference.

U.S. Pat. No. 4,394,727, entitled "Multi-Processor Task Dispatching Apparatus," of Hoffman et al. taught:

... task handling apparatus for a multiprocessor computer system where the tasks are distributed to the available processors. Each task is dispatched on the first available processor that can accept it. The signal dispatcher determines which processor is eligible to execute a higher priority task than is being currently executed by that processor. The signal dispatcher signals the eligible processor to activate its task dispatcher. The task dispatcher in the eligible processor performs the task switch and determines which task is to be dispatched. The processor performing the task switch runs its signal dispatcher to determine if the task it had been performing should be run by some other processor. When the processor which is running its signal dispatcher is the processor to do the task switch, it leaves the signal dispatcher cycles and switches to task dispatching cycles without any signaling taking place.

U.S. Pat. No. 4,394,727, Col. 17, lines 17 to 33.

SUMMARY OF THE INVENTION

According to one embodiment of the present invention, a novel process is used to safely shut down a central processing unit (CPU) in a symmetric multiprocessor system when the load on the system no longer justifies continued used of that CPU. Hence, this process provides new power saving capabilities that in turn permit the extension of the symmetric multiprocessor architecture to systems such as portable computers.

In one embodiment, the process includes determining a state of a CPU-enabled flag during execution of an idle thread by the central processing unit in the plurality of central processing units in the symmetric multiprocessor system. The CPU is shutdown upon finding that the state of the CPU-enabled flag indicates the CPU is not logically enabled.

The shutting down of the CPU only while executing an idle thread assures that processing of time critical, or other uninterruptible threads by the CPU are not interrupted. This shutdown technique also assures that no other thread is incorrectly terminated. Hence, this process assures that the CPU is safely shutdown.

The process further includes changing the state of the CPU-enabled flag from a first state to a second state. The first state indicates that the CPU is logically enabled, while the second state indicates that the CPU is not logically enabled. This change of state operation is performed only when shutting down the CPU will not significantly affect the performance of the symmetric multiprocessing system. To assure that the CPU is shutdown as quickly as possible without significantly affecting system performance, the process sets an execution priority of the idle thread to a high idle execution priority.

In another embodiment, a process determines an execution priority of an idle thread during execution of the idle thread by a central processing unit (CPU) in a plurality of central processing units in a symmetric multiprocessor system. The process shuts down the CPU during execution of the idle thread upon the determining that the execution priority of the idle thread is a shutdown priority.

A structure, according to one embodiment of the present invention includes a plurality of central processing units in a symmetric multiprocessing system and a memory system coupled to the plurality of central processing units. The memory system includes a plurality of CPU-enabled flags, and a queue including control blocks for executable threads. The control blocks include control blocks for idle threads. At least one of the control blocks for idle threads has a high idle execution priority.

In another embodiment of the present invention, a structure includes a plurality of central processing units in a symmetric multiprocessing system, and means for safely shutting down a central processing unit in the plurality of central processing units. The means for safely shutting down a central processing unit includes means for identifying a logically enabled state of the central processing unit, which in one embodiment is a means for checking a state of a CPU-enabled flag. The means for identifying a logically enabled state of the central processing unit is included in an idle thread executed by the central processing unit so that central processing unit can be shut down only when executing the idle thread.

In still another embodiment, a process includes assigning a first execution priority to one idle thread executed in a symmetric multiprocessor system. Execution of the one idle thread with the first execution priority by a central processing unit in the symmetric multiprocessor system results in the central processing unit idling. The process also includes assigning a second execution priority, different from the first execution priority, to the idle thread. Execution of the idle thread with the second execution priority results in shutting down the central processing unit. This process further includes assigning uninterruptible threads an execution priority higher than the second execution priority. Finally, the process includes assigning user mode tasks an execution priority between the first and second execution priorities.

BRIEF DESCRIPTION OF THE DRAWINGS

FIG. 5 is a process flow diagram of a halt CPU heuristic function according to one embodiment of this invention.

FIG. 6A is a process flow diagram of a configure CPU for power down function according to one embodiment of this invention.

FIG. 6B is a process flow diagram of a configure CPU for power down function according to another embodiment of this invention.

In the drawings and the following detailed description, elements with the same reference number are the same or similar elements. Also, the first digit of a reference numeral indicates the drawing in which the element having that reference numeral first appeared.

DETAILED DESCRIPTION OF THE INVENTION

Figure 1:
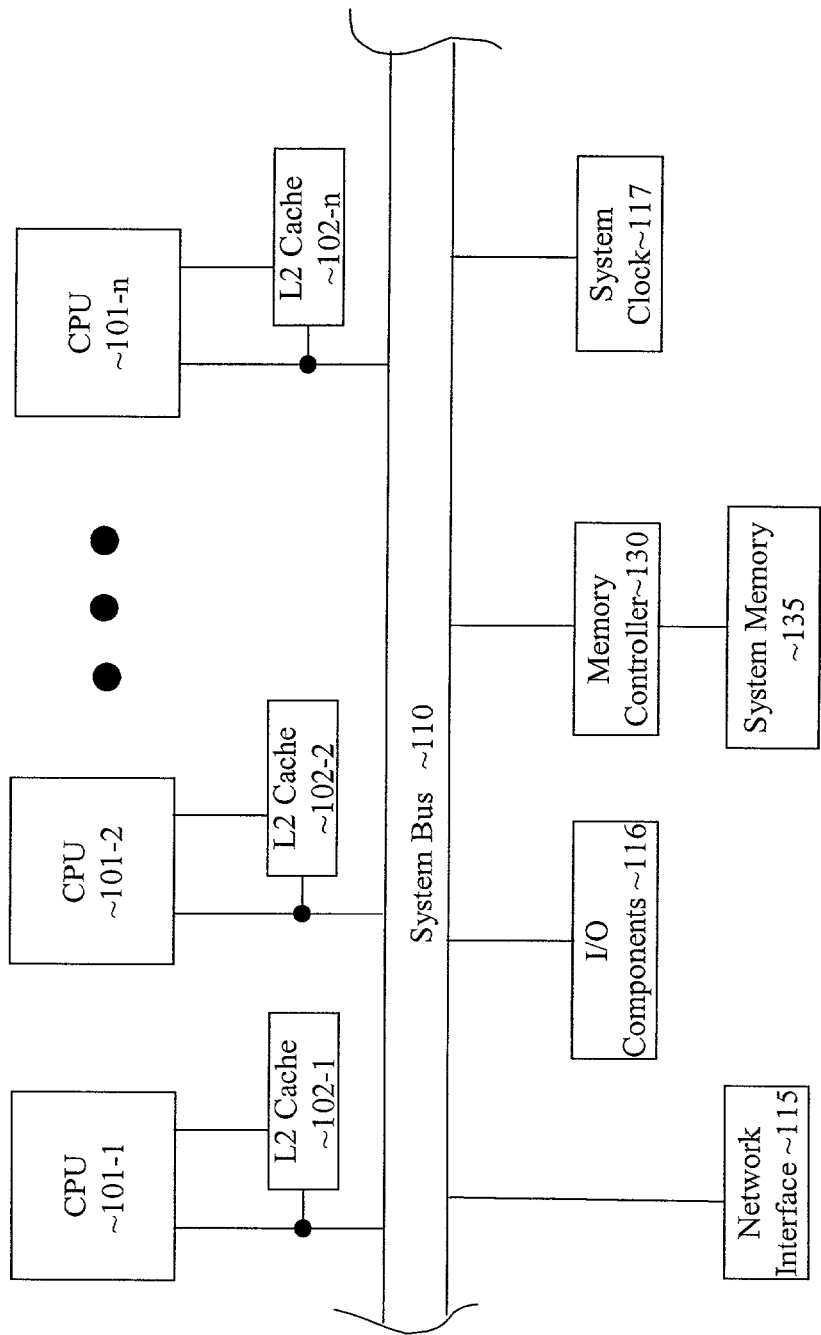
FIG. 1 is a block diagram of a prior art SMP system.

In one embodiment of the present invention, a symmetric multiprocessor (SMP) system 200 (FIG. 2A) includes a plurality of central processing units (CPUs) 201. Processing by a central processing unit (CPU) 201-i, where i can be any one of 1 to n, is safely halted i.e., CPU 201-i is shut down, using a technique that is described more completely below.

Halting CPU 201-i safely means (a) that central processing unit 201-i cannot be executing a thread other than an idle thread and (b) that state information for a thread does not reside only within CPU 201-i. The first limitation assures that CPU 201-i cannot be executing a time critical thread that fails if the execution of the time critical thread has to move to another CPU in the plurality of CPUs 201.

One embodiment of the present invention for safely halting CPU 201-i in SMP system 200 halts CPU 201-i after a heuristic procedure determines that the full processing capability of plurality of CPUs 201 is not needed to satisfy the current processing load. The heuristic procedure can be provided by a user application, the operating system, or perhaps both can have such heuristic procedures.

Power can be saved by halting execution of one or more CPUs, when the current processing demand on system 200 can be satisfied by less than all the CPUs. Consequently, SMP system 200 can be utilized in systems where power consumption is an issue, e.g., portable computers, as well as in large servers.

The technique for halting CPU processing, according to one embodiment of the present invention, allows CPU 201-i to be shut down only when CPU 201-i is executing an idle thread that determines that CPU 201-i is no longer logically enabled, i.e., a CPU-enabled flag for CPU 201-i has a state that indicates CPU 201-i is no longer logically enabled. This technique assures that the shutdown of CPU 201-i in SMP system 200 does not significantly affect the performance of SMP system 200 by halting execution of a thread that would cause an incorrect termination, or by halting execution of a time critical thread. Moreover, this technique assures that any information saved only in CPU 201-i has been moved to system memory 235 before CPU 201-i is shut down.

The technique of this invention for safely halting a CPU in system 200 can be implemented in a wide variety of ways. Accordingly, the embodiment described herein is illustrative only and is not intended to limit the invention to the specific embodiment described.

In one embodiment of this invention, each thread is assigned an execution priority. Table 1 is one example of thread execution priority assignments.

TABLE 1

| Execution Priority | Thread Type | Description |
| --- | --- | --- |
| 10 | Real Time | Uninterruptible |
| 9 | High Idle | Ready to shut-down CPU |
| 8–2 | Regular | User Mode Tasks such as word processing or CAD |
| 1 | Low Idle | Normal User Mode Idle State |

In one embodiment, each thread awaiting execution in an executable thread queue 240 has an associated execution priority, e.g., execution priority 242 in idle thread control block 241 for one idle thread and execution priority 244 in idle thread control block 243 for another idle thread.

In the following description, only operations necessary for understanding the present invention are illustrated. In view of this disclosure, one of skill in the art can implement this invention in a SMP system.

Herein, reference is sometimes made to a process. The process referred to is not a UNIX process. Herein, a process is any set of operations that includes the operations described. Also, an operation can include, for example, one or more steps that upon execution produce the action described.

In this embodiment, upon start up of system 200, an initialization operation is performed. In the initialization operation, each CPU in plurality of CPUs 201-1 to 201-n executes a different idle thread that in turn calls an idle loop function 262 (FIGS. 2A to 2C and 3), in this embodiment.

Set CPU enabled operation 301 (FIG. 3) initially sets a CPU-enabled flag 236-i for CPU 201-i, in a plurality of CPU-enabled flags 236 in system memory 235, to a first state. When CPU-enabled flag 236-i has the first state, CPU 201-i is logically enabled for processing.

In set priority operation 302, the idle thread also sets an execution priority field in the currently executing idle thread to a low idle execution priority. In this embodiment, the low idle execution priority is the lowest execution priority for a thread, i.e., a first execution priority. Processing transfers from operation 302 to halt CPU check operation 303.

In one embodiment of halt CPU check operation 303, the idle thread repeatedly checks to determine whether the CPU executing the idle thread is logically enabled. So long as the CPU is logically enabled, check operation 303 is repeated and so the CPU effectively idles. Herein, when it is stated that a thread or an operation takes some action, those of skill in the art will understand that a CPU executes one or more instructions that in turn results in the stated action.

Figure 3:
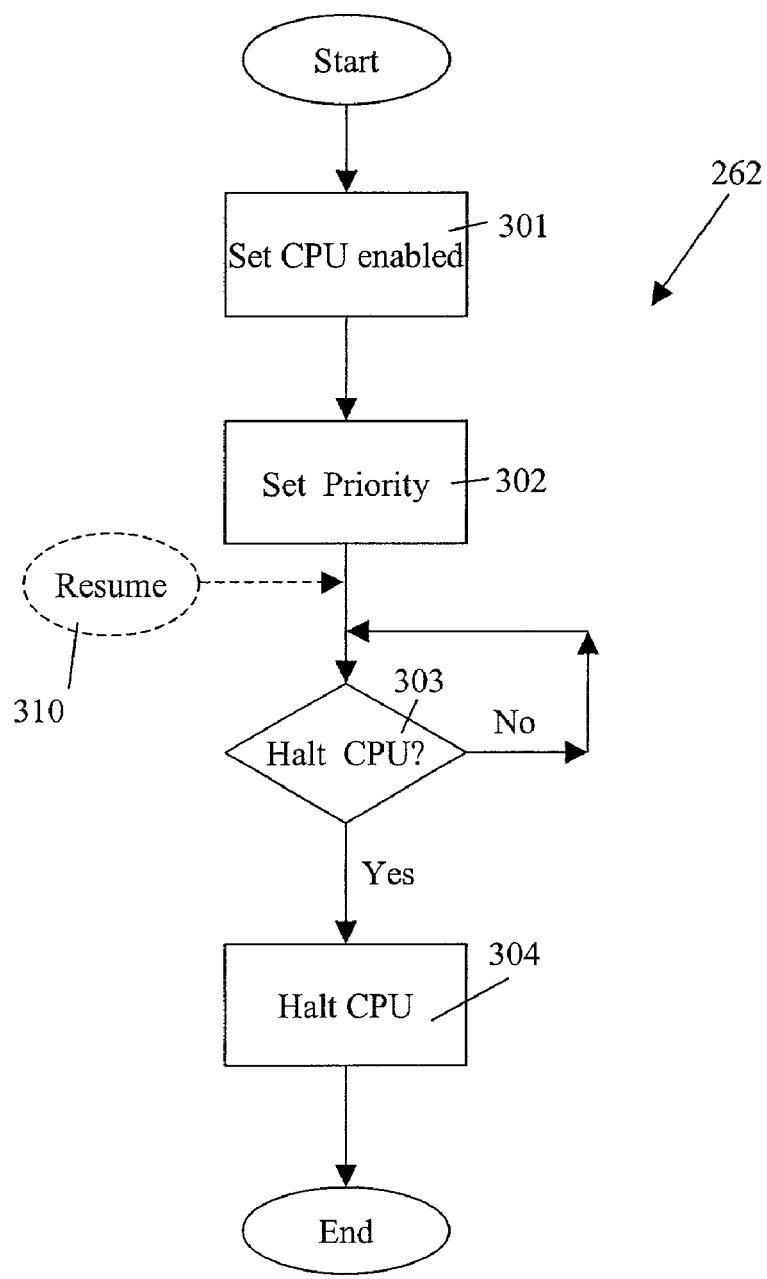
FIG. 3 is a process flow diagram of an idle loop function according to one embodiment of this invention.

As is known to those of skill in the art, following initialization, the operating system initiates execution of other threads on the occurrence of an interrupt to a CPU. As each idle CPU is interrupted, a context switch is performed and a control block for the executing idle thread is placed in executable thread queue 240 with data necessary to resume execution of the idle thread at the point where execution was interrupted. In FIG. 3, this is indicated by resume 310, which assumes that the idle thread was interrupted while executing check operation 303.

Figure 2A:
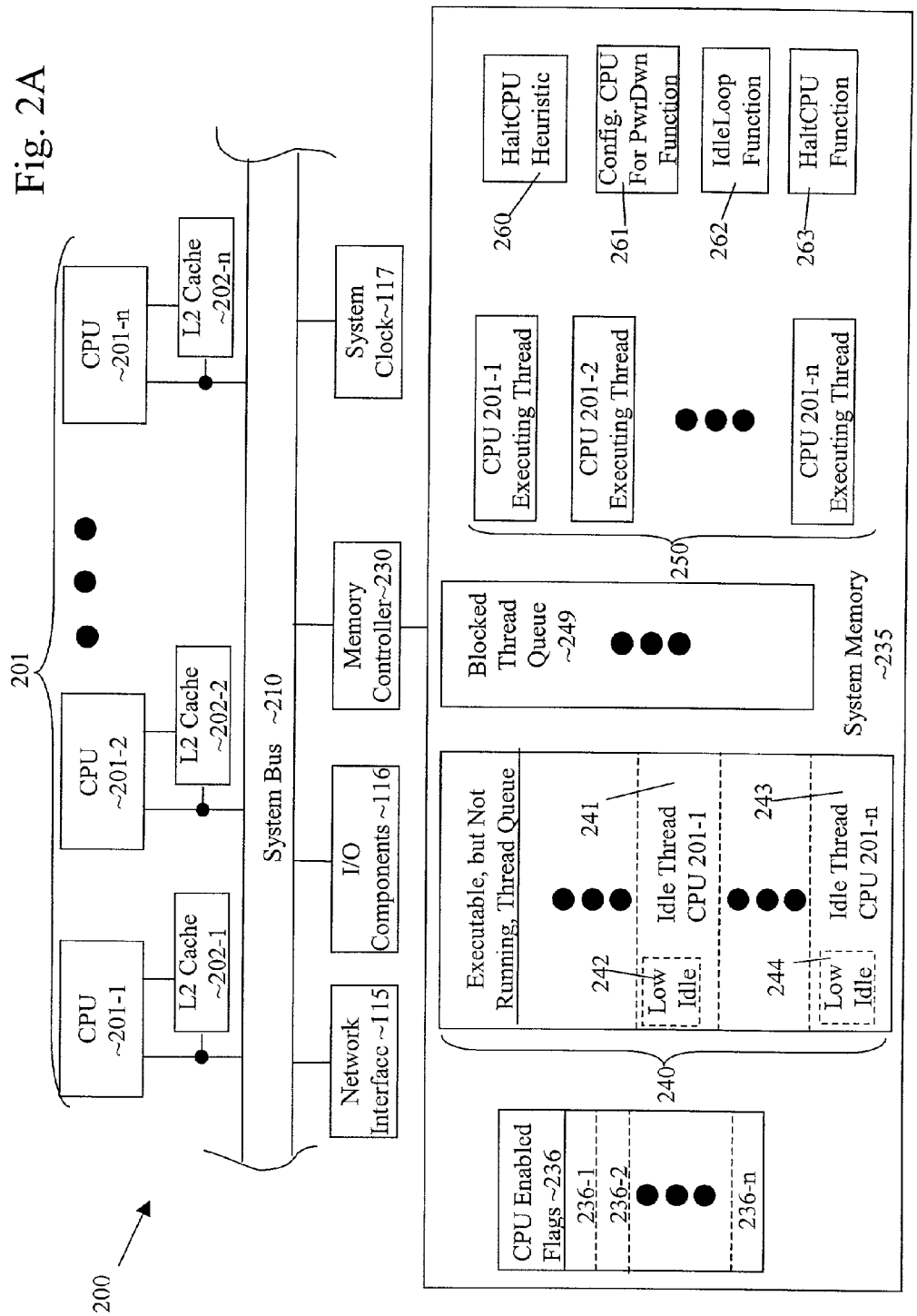
FIG. 2A is a block diagram of a SMP system according to one embodiment of the present invention with all idle threads in an executable thread queue having a low idle execution priority, e.g., normal execution priority.

Hence, when all the CPUs are executing other than the idle thread, the configuration of system memory 235 illustrated in FIG. 2A is obtained. Each of CPU-enabled flags 236-1 to 236-n is set to the first state. Executable thread queue 240 includes a plurality of executable thread control blocks that in turn includes idle thread control block 241 to idle thread control block 243, e.g., one idle thread control block for each CPU in plurality of CPUs 201. In this embodiment, the executable thread control blocks in queue 240 are ordered by execution priority.

System memory 235 also includes a blocked thread queue 249 that contains control blocks for threads that either are waiting for an I/O operation to complete, or are suspended. Each of CPUs 201-i to 201-n is executing a different thread in a plurality of executing threads 250.

When CPU 201-i completes execution of a thread, there is a context switch. Also, when CPU 201-i is interrupted, there may be a context switch. For the description of this invention, it assumed that in a context switch, CPU 201-i retrieves the highest execution priority thread on queue 240 and starts execution of that thread. CPU 201-i resumes execution of the idle thread when the idle thread has the highest execution priority thread on queue 240.

To facilitate understanding of this embodiment of the present invention, specific CPUs in system 200 are used as examples. In the configuration of FIG. 2A, each CPU 201-i in plurality of CPUs 201 is executing other than the idle thread.

Figure 4:
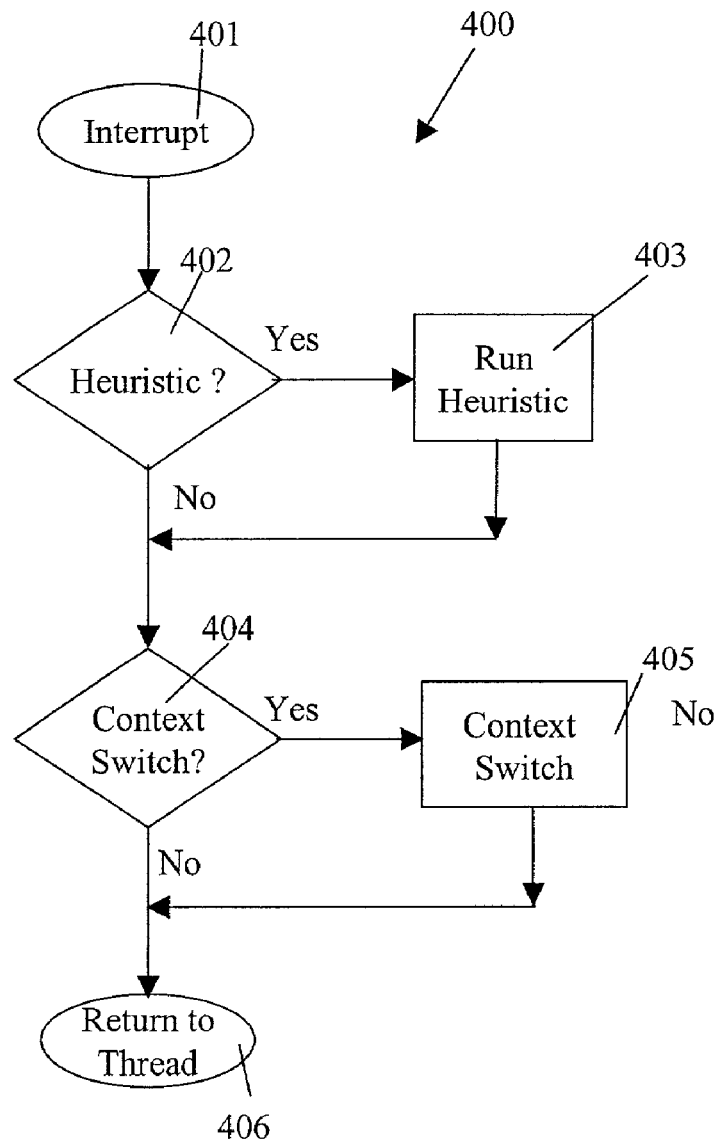
FIG. 4 is a process flow diagram for a portion of an interrupt handling procedure according to one embodiment of this invention.

When, for example, CPU 201-3 receives an interrupt, an interrupt handling procedure is executed. As is known to those of skill in the art, the interrupt handling procedure performs the operations necessary to respond to the interrupt appropriately. FIG. 4 is a process flow diagram for the portion of the interrupt handling procedure related to one embodiment of the present invention. Process 400, in the present embodiment, starts at interrupt operation 401 and transfers to heuristic check operation 402.

For this example, heuristic check operation 402 is false and processing transfers to context switch check operation 404. If a context switch is indicated, processing transfers to context switch operation 405 and otherwise returns, through return to thread 406, to the thread that was executing when the interrupt occurred.

Assuming a context switch is indicated, processing transfers to context switch operation 405. In operation 405, the information in highest execution priority thread control block is taken from stack 240 and loaded into the executing control block storage location in memory 235 for CPU 201-3. Again, those of skill in the art will understand that there are additional operations performed upon a context switch, but for clarity, these operations are not described herein because these operations are unnecessary for the understanding of the present invention.

For this example, the idle thread for CPU 201-3 is assumed to have the highest priority. Hence, operation 405 returns to execution of the idle thread through return to thread operation 406.

Figure 2B:
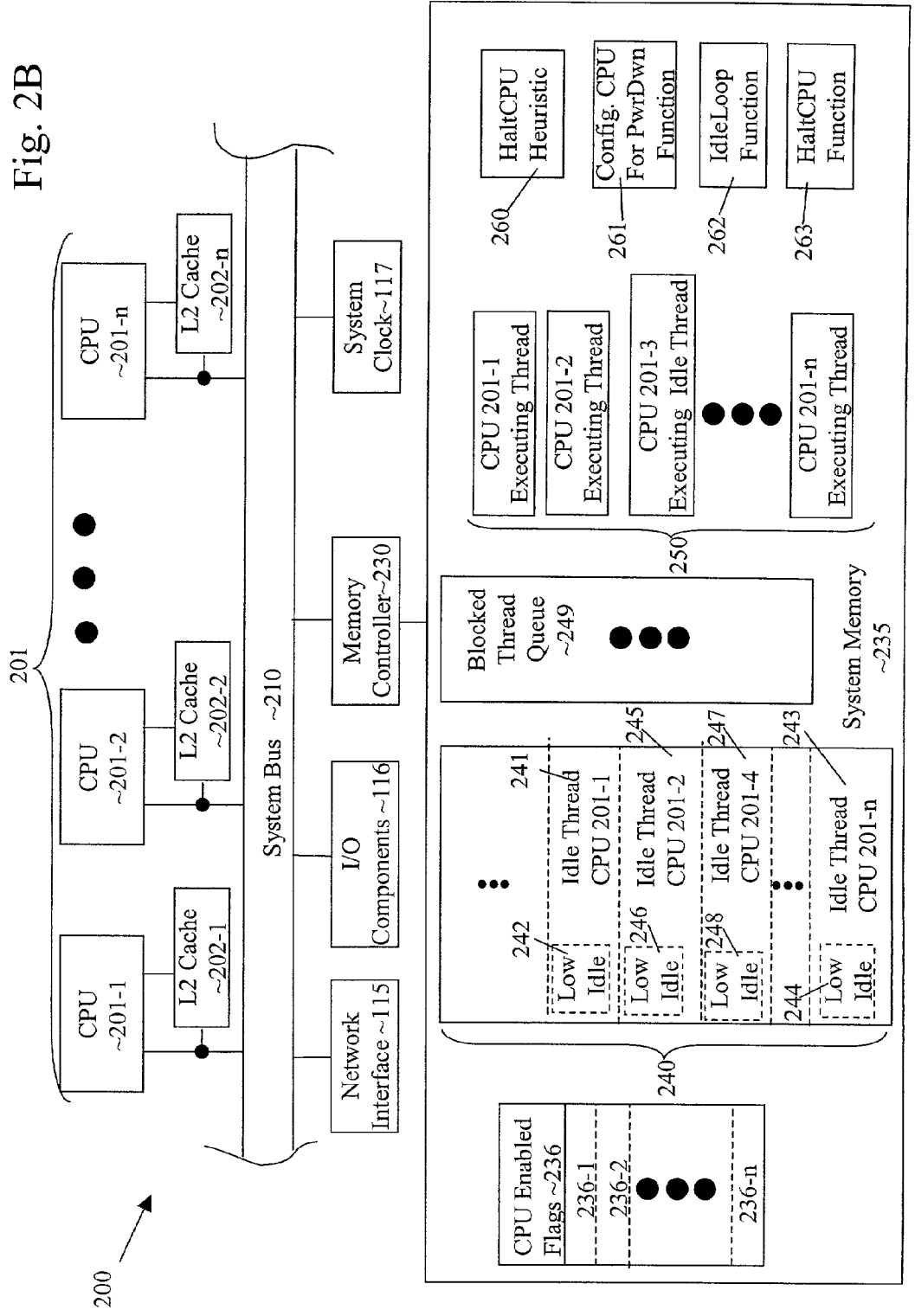
FIG. 2B is a block diagram of a SMP system according to one embodiment of the present invention with all idle threads in the executable thread queue having a low idle execution priority, e.g., normal execution priority, and with one of the idle threads executing.
Figure 2C:
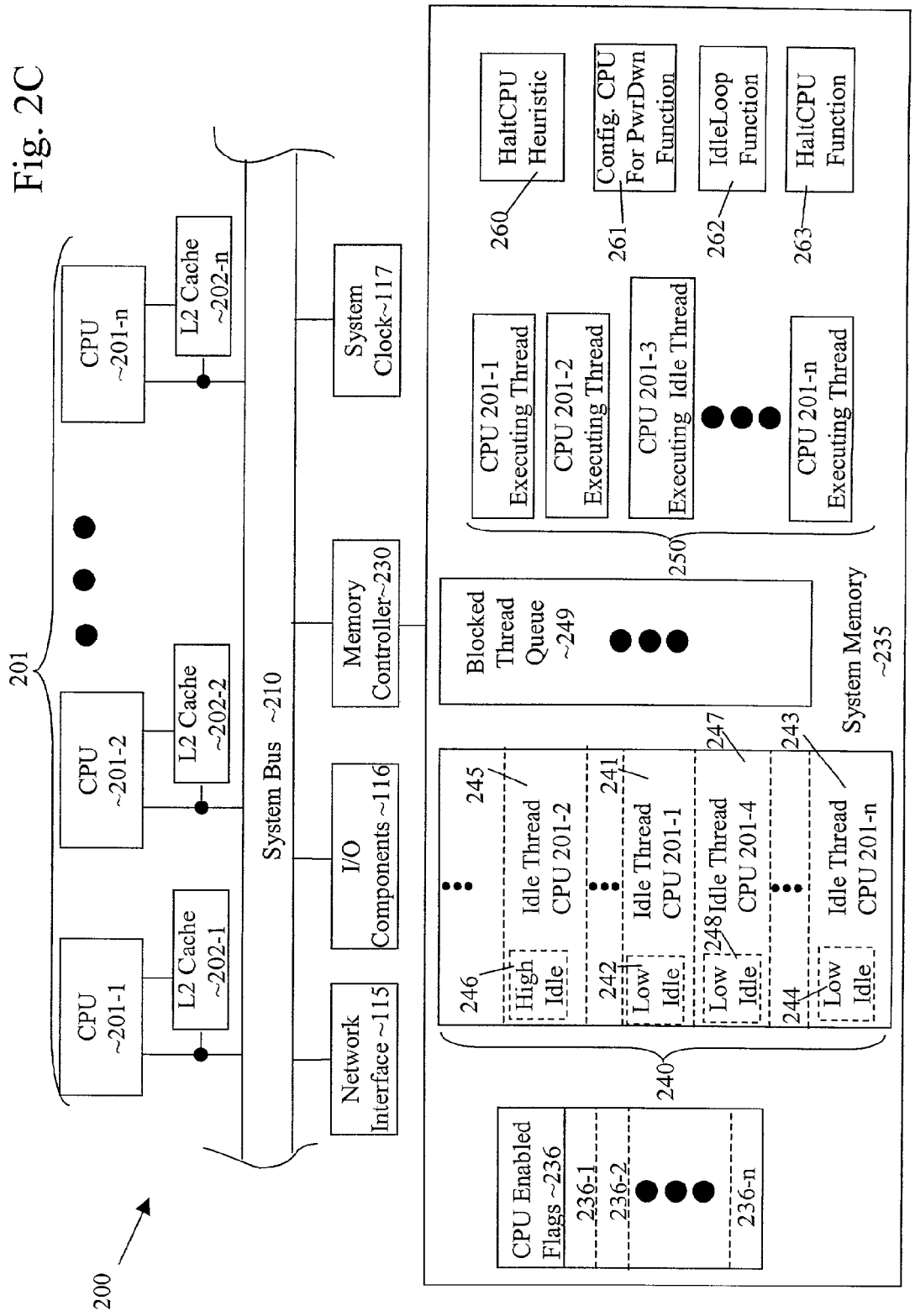
FIG. 2C is a block diagram of a SMP system according to one embodiment of the present invention with one of the idle threads in the executable thread queue having the execution priority changed to a shutdown priority, e.g., a high idle execution priority.

Upon completion of operation 400 for this example, the configuration of system memory 235 illustrated in FIG. 2B is obtained. There is no idle thread control block for CPU 201-3 on queue 240. CPU 201-3 is repeatedly executing halt CPU check operation 303 (FIG. 3) because CPU 201-3 is logically enabled and so check operation 303 is false.

Continuing from the configuration of FIG. 2B, assume that next, for example, CPU 201-2 is interrupted and execution of operation 400 (FIG. 4) is started. Heuristic check operation 402 determines whether to transfer to run heuristic operation 402 that in turn executes a heuristic procedure, or to context switch check operation 404 that was described above.

The heuristic procedure could be executed after every interrupt, or at a particular time interval, etc. The particular technique used for scheduling execution of the heuristic procedure is not essential to this invention. The particular execution schedule selected is implemented via heuristic check operation 402.

In this example, it is assumed that when CPU 201-2 is interrupted, check operation 402 transfers to run heuristic operation 403. Run heuristic operation 403 executes a halt CPU heuristic procedure 260 that determines whether a CPU in the plurality of CPUs 200 should be halted.

Hence, in run heuristic operation 403, a determination is made by halt CPU heuristic procedure 260 executing on CPU 201-2 upon whether a CPU should be halted. For example, if four CPUs were running with a CPU utilization of 20 percent, one CPU could be halted and the three remaining CPUs could handle the processing load without much, if any, degradation in performance. Conversely, if the CPU utilization were 90 percent, halting one of the four CPUs would result in a significant degradation of performance. Hence, heuristic procedure 260 makes a determination, based upon some criteria, as whether to halt a CPU.

FIG. 5 is a process flow diagram for one embodiment of halt CPU heuristic procedure 260. Determine whether to halt CPU operation 501 makes the determination on whether to halt a CPU. The particular instructions included in operation 501 are not essential to this invention. The important aspect is that the heuristic makes a decision on whether to power down a CPU. Upon completion, operation 501 transfers processing to halt CPU check operation 502.

In halt CPU check operation 502, if the decision was to halt a CPU, processing transfers to run configure CPU for power down operation 503. Conversely, if the decision was not to halt a CPU, operation 504 does any necessary clean up to complete the execution of the heuristic procedure and then transfers processing to context switch check operation 404 (FIG. 4).

If the decision was to halt operation of a CPU, operation 503 executes configure CPU for power down function 261. The implementation of function 261 depends upon the criterion or criteria used in halt CPU check operation 303 of idle loop function 262 (FIG. 3).

In one embodiment, the state of the CPU-enabled flag is used in combination with execution of the idle thread to determine when processing by a CPU can be safely halted, i.e., check operation 303 checks the state of the CPU-enabled flag. Processing is stopped only when the state of the CPU-enabled flag indicates that the CPU is not logically enabled. Thus, for this embodiment, check operation 303 tests the state of the CPU-enabled flag.

In another embodiment, the execution priority assigned to the idle thread is used in combination with execution of the idle thread to determine when processing by a CPU can be safely halted. Processing is stopped only when the executing idle thread has a pre-selected execution priority, which in this embodiment is the high idle execution priority. In this embodiment, check operation 303 tests the execution priority of the idle thread.

When check operation 303 tests the state of the CPU-enabled flag, configure CPU for power down function 261A (FIG. 6A) is executed in operation 503. When check operation 303 tests the execution priority of the idle thread, configure CPU for power down function 261B (FIG. 6B) is executed in operation 503.

For this example, function 261A (FIG. 6A) is used. Hence, when CPU 201-2 is executing halt CPU heuristic procedure 260, operation 503 executes function 261A. Clear CPU enabled operation 601 sets CPU-enabled flag 236-2 to the second state to indicate that CPU 201-2 is no longer logically enabled and transfers to set priority operation 602. Set priority operation 302 also changes execution priority 246 in idle thread control block 245 from the low idle execution priority (FIG. 2B), i.e., a normal idle execution priority, to a high idle execution priority (FIG. 2C), i.e., to a shutdown priority. Operation 602 does any necessary clean up to complete the execution of heuristic procedure 260 and then transfers processing to context switch operation 404 (FIG. 4). See also Table 2.

Assuming that there is a real time thread on queue 240, this thread in loaded for execution by CPU 201-2 in context switch operation 405. Return to thread operation 406 returns to the execution of the real time thread. When there are no higher execution priority threads on queue 240, in response to an interrupt, CPU 201-2, in context switch operation 405 loads idle thread 201-2 and transfers to execution of that thread.

In this example, execution of the idle thread resumes in halt CPU check operation 303. Halt CPU check operation 303 detects that CPU-enabled flag 236-2 for CPU 201-2 is in the second state, e.g., is not logically enabled, and so check operation 303 transfers to halt CPU operation 304.

The implementation of halt CPU operation 304 depends upon how CPU 201-2 is restarted. In one embodiment, information for restarting the idle thread is saved, any necessary clean up is done, and then CPU 201-2 is suspended. In another embodiment, any necessary clean up is done and then CPU 201-2 is turned off, i.e., shut down. In the embodiment of Table 2, halt CPU operation 304 calls function HaltCPU 263 in memory 235. The operations performed by function HaltCPU 263 were described above.

If upon halting a CPU information for restarting the CPU is saved, a start CPU process of Table 2 is called by the thread used to restart the CPU. In this embodiment, the CPU-enabled flag for the CPU being restarted is set to the first state. A function startCPUprim is used to restart the halted CPU in the same state as the CPU was just prior to processing by the CPU being halted, i.e., executing in the idle loop.

In this embodiment, a heuristic procedure is used to determine whether to power-down a CPU in plurality of CPUs 201. Upon determining to power-down the CPU, conditions were set so that CPU was powered down only when the CPU was executing an idle thread, and when state information for a thread did not reside only within the CPU. Also, the conditions assured execution of any higher execution priority thread, i.e., a time critical thread, was not interrupted. Consequently, it was assured the termination of execution of the thread did not result in an execution error.

TABLE 2

```
void Config_Cpu_for_PwrDwn(int cpuNumber) {
    CpuEnabled[cpuNumber] = false;
    SetPriority(IdleTask[cpuNumber], HIGHIDLE PRIORITY);
}
void startCpu(int cpuNumber) {
    CpuEnabled[cpuNumber] = True;
    startCPUPrim(cpuNumber);
}
void idleLoop(int cpuNumber) {
    while (true) {
        CpuEnabled[cpuNumber] == true;
        SetPriority(IdleTask[cpuNumber], LOWIDLE PRIORITY);
        While (CpuEnabled[cpuNumber]) {
            /* Do Nothing*/
        }
        haltCPU( );
    }
}
```

As indicated above, the embodiment described herein is illustrative only and is not intended to limit the invention to the specific embodiment described. In view of this disclosure, those of skill in the art can implement the technique for safely halting a CPU in a SMP system in a variety of ways.

I claim:

1. A process comprising:
   determining a state of a CPU-enabled flag during execution of an idle thread by a central processing unit (CPU) in a plurality of central processing units in a symmetric multiprocessor system; and
   shutting down said CPU during execution of said idle thread, upon said determining said state of said CPU-enabled flag finding that said state indicates said CPU is not logically enabled.

2. The process of claim 1 further comprising:
   changing said state of said CPU-enabled flag from a first state to a second state, wherein said second state indicates that said CPU is not logically enabled.

3. The process of claim 2 further comprising:
   setting said state of said CPU-enabled flag to said first state, wherein said first state indicates that said CPU is logically enabled.

4. The process of claim 2 further comprising:
   setting an execution priority of said idle thread to a high idle execution priority.

5. The process of claim 1 further comprising:
   setting said state of said CPU-enabled flag to a first state, wherein said first state indicates that said CPU is logically enabled.

6. A process comprising:
   setting an execution priority of an idle thread to a high idle execution priority;

determining a state of a CPU-enabled flag, during execution of said idle thread, by a central processing unit (CPU) corresponding to said CPU-enabled flag wherein said CPU is in a plurality of central processing units in a symmetric multiprocessor system; and shutting down said CPU during execution of said idle thread, upon said determining said state of said CPU-enabled flag finding that said state indicates said CPU is not logically enabled.

7. A process comprising:

setting a state of a CPU-enabled flag to a first state, wherein said first state indicates that a central processing unit (CPU) corresponding to said CPU-enabled flag is logically enabled, and further wherein said CPU is in a plurality of central processing units in a symmetric multiprocessor system;

setting an execution priority of an idle thread to a low idle execution priority;

determining said state of said CPU-enabled flag during execution of said idle thread by said CPU; and shutting down said CPU during execution of said idle thread, upon said determining said state of said CPU-enabled flag finding that said state indicates said CPU is not logically enabled.

8. The process to claim 7 further comprising:

changing said state of said CPU-enabled flag from said first state to a second state, wherein said second state indicates that said CPU is not logically enabled.

9. The process of claim 7 further comprising:

changing said execution priority of said idle thread from said low idle execution priority to a high idle execution priority.

10. A process comprising:

setting a state of a CPU-enabled flag to a first state, wherein said first state indicates that a central processing unit (CPU) corresponding to said CPU-enabled flag is logically enabled, and further wherein said CPU is in a plurality of central processing units in a symmetric multiprocessor system;

setting an execution priority of an idle thread to a low idle execution priority;

changing said state of said CPU-enabled flag from said first state to a second state, wherein said second state indicates that said CPU is not logically enabled;

changing said execution priority of said idle thread from said low idle execution priority to a high idle execution priority;

determining a state of said CPU-enabled flag during execution of said idle thread by said CPU; and shutting down said CPU during execution of said idle thread, upon said determining said state of said CPU-enabled flag finding that said state indicates said CPU is not logically enabled.

11. A process comprising:

determining an execution priority of an idle thread during execution of said idle thread by a central processing unit (CPU) in a plurality of central processing units in a symmetric multiprocessor system;

changing said execution priority from a normal idle execution priority to a shutdown priority; and shutting down said CPU during execution of said idle thread, upon said determining said execution priority finding that said execution priority of said idle thread is said shutdown priority.

12. A structure comprising:

a plurality of central processing units in a symmetric multiprocessing system; and a memory system coupled to said plurality of central processing units, said memory system further comprising:

a plurality of CPU-enabled flags wherein when a CPU-enabled flag for a central processing unit (CPU) has a first state, the CPU is logically enabled, and when said CPU-enabled flag for said CPU has a second state, the CPU is not logically enabled; and a queue including control blocks for executable threads, wherein said control blocks includes control blocks for idle threads and further wherein at least one of said control blocks for idle threads has a high idle execution priority.

13. A structure comprising:

a plurality of central processing units in a symmetric multiprocessing system; and means for safely shutting down a central processing unit in said plurality of central processing units, said means further comprising:

means for setting an execution priority of an idle thread to other than a lowest priority.

14. The structure of claim 13 wherein said means for safely shutting down a central processing unit further comprises:

means for identifying a logically enabled state of said central processing unit.

15. The structure of claim 14 wherein said means for identifying a logically enabled state of said central processing unit is included in an idle thread executed by said central processing unit.

16. The structure of claim 13 wherein said means for setting an execution priority of an idle thread is included in a heuristic procedure executed by said central processing unit.

17. A process comprising:

assigning a first execution priority to one idle thread executed in a symmetric multiprocessor system wherein execution of said one idle thread with said first execution priority by a central processing unit in said symmetric multiprocessor system results in said central processing unit idling; and assigning a second execution priority, different from said first execution priority, to said idle thread wherein execution of said idle thread with said second execution priority results in shutting down said central processing unit.

18. The process of claim 17 further comprising assigning uninterruptible threads an execution priority higher than said second execution priority.

19. The process of claim 17 further comprising assigning user mode tasks an execution priority between said first and second execution priorities.

20. A process comprising:

assigning a first execution priority to one idle thread executed in a symmetric multiprocessor system wherein execution of said one idle thread with said first execution priority by a central processing unit in said symmetric multiprocessor system results in said central processing unit idling;

assigning a second execution priority, different from said first execution priority, to said idle thread wherein execution of said idle thread with said second execution priority results in shutting down said central processing unit;

assigning uninterruptible threads an execution priority higher than said second execution priority; and assigning user mode tasks an execution priority between said first and second execution priorities.

* * * * *